`United States Patent` [19]　　[11] Patent Number: 4,502,271
Hansen et al.　　[45] Date of Patent: Mar. 5, 1985

[54] REAR DISCHARGE MULTI-BLADE ROTARY MOWER

[75] Inventors: Loren F. Hansen; John E. Hicks, both of Lincoln, Nebr.

[73] Assignee: Outboard Marine Corporation, Waukegan, Ill.

[21] Appl. No.: 589,843

[22] Filed: Mar. 15, 1984

Related U.S. Application Data

[63] Continuation of Ser. No. 462,036, Jan. 28, 1983, abandoned.

[51] Int. Cl.³ .................... A01D 35/264; A01D 35/12
[52] U.S. Cl. .............................. 56/320.1; 56/13.6; 56/DIG. 22
[58] Field of Search .............. 56/6, 13.6, 320.1, 320.2, 56/DIG. 22

[56] References Cited

U.S. PATENT DOCUMENTS

| | | | |
|---|---|---|---|
| 3,136,106 | 6/1964 | Joslin | 56/13.6 |
| 3,157,014 | 11/1964 | Bottenberg | 56/6 |
| 3,166,880 | 1/1965 | Robinson | 56/6 |
| 3,234,719 | 2/1966 | Rank | 56/13.6 |
| 3,483,684 | 12/1969 | Price | 56/13.6 |
| 3,601,958 | 8/1971 | Roof | 56/13.7 |
| 3,706,186 | 12/1972 | Hurlburt et al. | 56/DIG. 22 |
| 3,727,386 | 4/1973 | Jesperson et al. | 56/320.1 |
| 3,916,606 | 11/1975 | Brudnak, Jr. et al. | 56/6 |
| 3,918,119 | 11/1975 | Sweet | 56/13.4 |
| 4,102,114 | 7/1978 | Estes et al. | 56/DIG. 22 |
| 4,134,249 | 1/1979 | Wuerker et al. | 56/320.1 |
| 4,257,214 | 3/1981 | Ferguson et al. | 56/320.2 |
| 4,316,356 | 2/1982 | Planeta | 56/DIG. 22 |
| 4,341,060 | 7/1982 | Lowry et al. | 56/320.1 |

FOREIGN PATENT DOCUMENTS 2928494 1/1981 Fed. Rep. of Germany ....... 56/13.6

Primary Examiner—Paul J. Hirsch
Attorney, Agent, or Firm—Michael, Best & Friedrich

[57] ABSTRACT

The rotary mower has a blade housing supported on wheels for travel along the ground and including a top deck, a front wall and opposed side walls depending from the top deck, a rear wall depending from the top deck and extending transversely between the rear portions of the side walls, and a plurality of cutter blades which are mounted inside the blade housing and are rotated in the same direction about laterally spaced vertical axes. A flexible flap extending transversely generally coextensively with the rear wall and extending substantially vertically down to engage the mowed grass forms an effective air seal substantially across the rear of the blade housing. A portion of the grass clippings is impelled rearwardly toward the rear wall and another portion is impelled transversely toward an arcuate baffle disposed inside the blade housing near one of the side walls, extending between the front and rear walls of the blade housing, and having a rear portion extending closely adjacent the travel path of the corresponding cutter blade. The arcuate baffle guides the latter portion of the grass clippings in a direction along the rear wall and thereby promotes even distribution of the clippings from the rear of the blade housing.

9 Claims, 5 Drawing Figures

U.S. Patent   Mar. 5, 1985   4,502,271
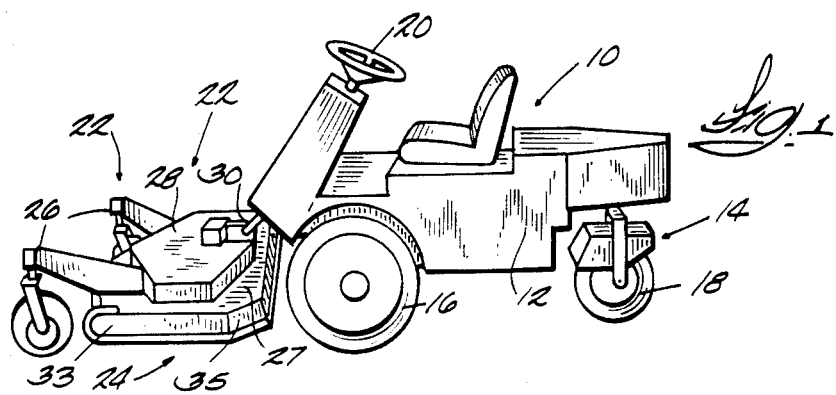
Fig. 1
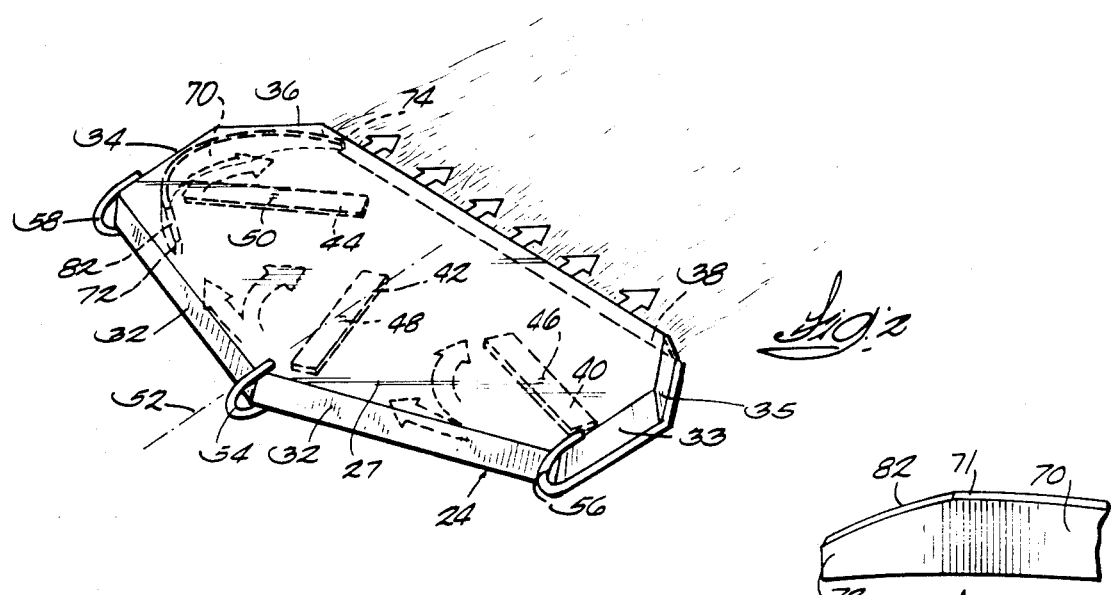
Fig. 2
Fig. 5
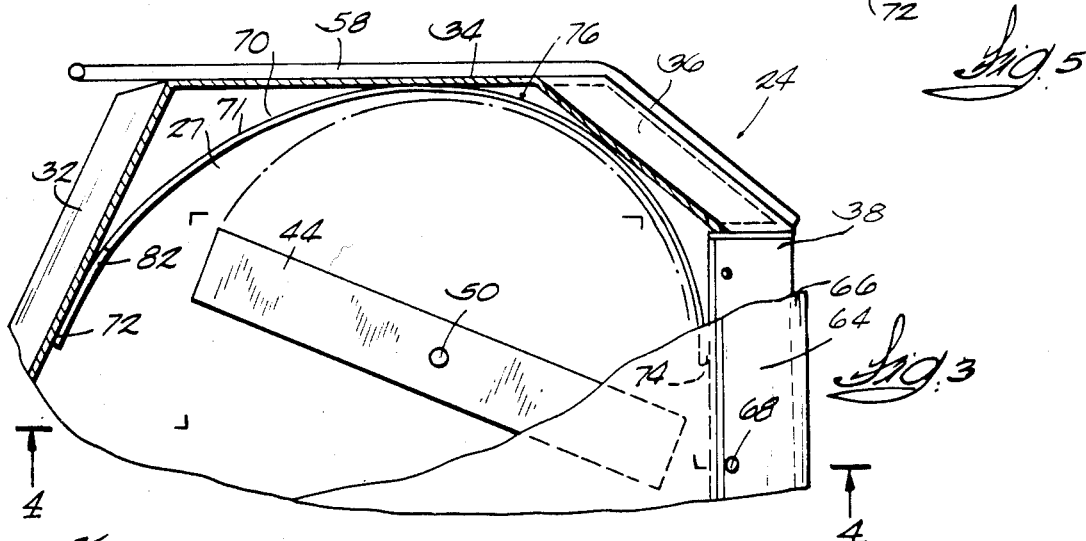
Fig. 3
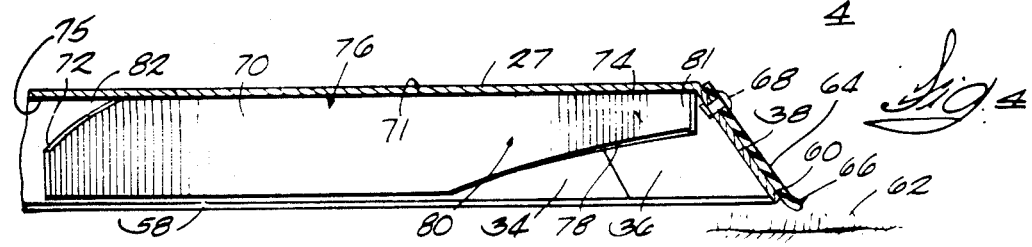
Fig. 4

REAR DISCHARGE MULTI-BLADE ROTARY MOWER

This is a continuation of U.S. Ser. No. 462,036, filed 1-28-83, now abandoned.

BACKGROUND OF THE INVENTION

This invention relates to rotary mowers and, more particularly, to rotary mowers including a blade housing enclosing a plurality of cutter blades and having a rear discharge.

Larger rotary mowers including a plurality of cutter blades enclosed in a housing commonly are mounted on the front, side, or rear of a tractor or similar vehicle or are pulled behind such a vehicle. Such mowers typically include a chute opening or baffles extending around each blade. In either case, the clippings tend to become piled in windrows.

Attention is directed to the following U.S. patents:

| Patentee | U.S. Pat. No. | Issue Date |
| --- | --- | --- |
| Maguire | 3,053,033 | Sept. 11, 1962 |
| Bottenberg | 3,157,014 | Nov. 17, 1964 |
| Jesperson, et al | 3,727,386 | April 17, 1973 |

SUMMARY OF THE INVENTION

The invention provides a rotary mower including a blade housing supported on wheels for travel along the ground and including a top deck, a front wall and opposed side walls depending from the top deck, and a rear wall depending from the top deck and extending transversely between the rear portions of the side walls, means extending transversely and generally coextensively with the rear wall and extending downwardly to engage the mowed grass and form an air seal substantially across the rear of the blade housing, a plurality of cutter blades mounted inside the blade housing for rotary movement about laterally spaced vertical axes, an arcuate baffle disposed inside the blade housing near one of the side walls and extending between the front and rear walls of the blade housing, and drive means for rotating the cutter blades in the same direction such that a portion of the grass clippings cut by the cutter blades is impelled rearwardly toward the rear wall and another portion is impelled transversely toward said baffle and is guided by said baffle for distribution along the rear wall.

In one embodiment, the travel paths of the cutter blades do not overlap.

In one embodiment, the rear portion of the baffle extends closely adjacent the travel path of the corresponding one of the cutter blades. The lower edge of the rearmost portion of the baffle preferably is tapered upwardly toward the rear end of the baffle.

In one embodiment, the air seal forming means is a flap of flexible material which is mounted on the rear wall of the blade housing and has a lower portion which extends below the lower edge of the rear wall.

One of the principal features of the invention is the provision of a multi-blade, rear discharge rotary mower which is arranged to provide substantially uniform distribution of grass clippings from the rear of the blade housing.

Another of the principal features of the invention is the provision of a multi-blade, rear discharge rotary mower including a blade housing enclosing a plurality of rotary cutter blades, means for forming an effective air seal across the rear of the blade housing, a means for directing a portion of the grass clippings in a direction along the rear wall of the blade housing.

A further of the principal objects of the invention is the provision of a rotary mower described in the next preceding paragraph including an arcuate baffle disposed adjacent one side wall of the blade housing and extending between the front and rear walls of the blade housing with a portion extending closely adjacent the corresponding cutter blade.

Other features, aspects and advantages of the invention will become apparent to those skilled in the art upon reviewing the following description, the drawing and the appended claims.

BRIEF DESCRIPTION OF THE DRAWING

FIG. 1 is a perspective view of a riding lawn mower including a rotary mower unit embodying various of the features of the invention.

FIG. 2 is an enlarged, perspective view of the blade housing of the rotary mower unit shown in FIG. 1.

FIG. 3 is an enlarged, fragmentary, top plan view of the blade housing shown in FIG. 2.

FIG. 4 is a sectional view taken generally along line 4—4 in FIG. 3.

FIG. 5 is a fragmentary, perspective view of the front end portion of the baffle.

Before explaining at least one embodiment of the invention in detail, it is to be understood that the invention is not limited in its application to the details of the construction and arrangement of parts set forth in the following description or illustrated in the accompanying drawing, since the invention is capable of other embodiments and being practiced or carried out in various ways. Also, it is to be understood that the phraseology and terminology employed herein is for the purpose of description and not of limitation.

DESCRIPTION OF THE PREFERRED EMBODIMENTS

Illustrated in the drawing is a riding mower 10 including a chassis 12 supported for travel over the ground by a steering unit 14 mounted for rotation about a vertical steering axis on the rear portion of the chassis 12 and a pair of laterally spaced front wheels 16 (one shown). The steering unit 14 includes a rear wheel 18 and steering movement is accomplished by a steering wheel 20 operatively connected to the steering unit 14 in a suitable manner.

Located forwardly of the front wheels 16 is a rotary mower unit 22 suitably mounted on the chassis 12 for pivotal movement between a lowered, mowing position shown in FIG. 1 and a raised, non-mowing position. The rotary mower unit 22 includes a blade housing 24 supported for travel over the ground by a pair of caster wheel assemblies 26.

The blade housing 24 has a horizontally extending top deck 27 supporting a conventional drive mechanism (not shown) covered by a shroud 28. The drive mechanism is driven by a power takeoff shaft 30 connected to the vehicle power source (not shown). Depending from the outer edges of the top deck 27 are a front skirt or wall 32, opposed side skirts or walls 33 and 34 including respective inwardly inclined rear portions 35 and 36, and a rear skirt or wall 38 extending transversely between the side wall rear portions 35 and 36. In the specific construction illustrated, the front wall 32, the side wall rear portions 35 and 36, and the rear wall 38 are inclined outwardly and downwardly.

Disposed beneath the top deck 26 and enclosed by the front wall 32, the side walls 33 and 34 and the rear wall 38 is a plurality (e.g., 3) of cutter blades 40, 42 and 44 which are mounted for rotation about respective vertical axes 46, 48 and 50 and are driven by the driving mechanism. The rotational axes 46, 48 and 50 are laterally spaced relative to each other so that the travel paths of the cutter blades 40, 42 and 44 do not overlap, but are relatively close to each other as illustrated in FIG. 2.

While other arrangements can be used, in the specific construction illustrated, the front portion of the blade housing 24 has a generally triangular shape and the rotational axes 46, 48 and 50 form a triangle. More specifically, the rotational axis 48 of the center cutter blade 42 is located on the longitudinal axis 52 of the blade housing 24 and the rotational axes 46 and 48 of the cutter blades 40 and 44 are spaced rearwardly and laterally outwardly at equal distances from the rotational axis 48.

The cutter blades 40, 42 and 44 are rotated in the same direction by the drive mechanism (clockwise in the illustrated construction as viewed in FIG. 2). Air streams laden with a portion of the grass clippings cut by the cutter blades 40, 42 and 44 are impelled rearwardly toward the rear wall 38 of the blade housing 24. Air streams laden with another portion of the grass clippings are impelled toward the next cutter blade, and eventually toward one side of the blade housing, in the rotational direction of the cutter blades 40, 41 and 44 (toward the side wall 34 in the illustrated construction) as shown by the arrows in FIG. 2.

The caster wheel assemblies 26 preferably are arranged in a conventional manner so that the vertical relationship of the blade housing 27 to the ground can be adjusted to vary the height of the grass being cut. Forwardly extending skids 54, 56 and 58 are mounted on the front and sides of the blade housing 24 to engage the ground, when uneven ground is being traversed, and serve to minimize scalping by the cutter blades 40, 42 and 44.

Means are provided to form an air seal across the rear of the blade housing 24 in order to prevent an excessive discharge of air and/or grass clippings through any particular area at the rear of the blade housing 24. As used herein the term "air seal" does not mean an absolute seal against leakage. Instead, it means an effective seal or barrier for preventing unrestricted passage of air laden with grass clippings or "clumps" of glass clippings from beneath the rear wall 38 of the blade housing 27. In the specific construction illustrated, a transversely extending skirt or flip 64 made from a relatively flexible material, such as a rubber or vinyl plastic material, is provided for this purpose. The flap 64 extends transversely and generally coextensively with the rear wall 38 of the blade housing 24 and has a lower edge portion 66 which extends downwardly below the lower edge 60 of the rear wall 38. The flap 64 preferably is removably mounted on the outside of the rear wall 38 by bolts 68 or the like so it can be replaced in the event of excessive wear, cracking, etc. The flap 64 is dimensioned so that the lower portion is in engagement with the drags over the mowed grass 62 when the blade housing 24 is in all cutting positions, including the uppermost position. To minimize "clumping" of the grass clippings, the lower portion of the flap 64 extending below the blade housing rear wall 38 preferably is rearwardly and downwardly inclined as illustrated in FIG. 4.

Means are provided for enhancing a relatively uniform distribution across the rear of the blade housing 24 of the grass clippings which are impelled toward one side of the blade housing 24. In the specific construction illustrated, an arcuate baffle 70 located near the side wall toward which streams of air laden with grass clippings are impelled (i.e., side wall 34) is provided for this purpose. More specifically, the arcuate baffle 70 is located adjacent the side wall 34, has a forward end 72 located adjacent the front wall 32, and a rear end 74 located adjacent the rear wall 38. The top edge 71 of the baffle 70 adjoins and is welded or otherwise suitably fastened to the underside 75 of the top deck of the blade housing 27. A rear portion of the baffle extends closely adjacent the travel path of the cutter blade 44. Streams of air laden with grass clippings impelled toward the side wall 34 are directed by the baffle 70 in a direction generally parallel to and along the rear wall 38 where they are mixed with the rearwardly directed grass-laden air streams, thereby promoting a uniform distribution of the grass clippings across the rear of the blade housing 24. The baffle 70 preferably extends through an arc of approximately 180 degrees.

To further promote uniform distribution of the grass clippings, the bottom edge 78 of the rearmost portion 80 of the baffle 70 preferably is tapered upwardly and rearwardly as best shown in FIG. 4. This tapered portion 80 effectively decreases the velocity of the grass-laden air streams discharging or exiting from the lower portion of the baffle 70, so that the grass clippings are thrown or impelled to progressively shorter distances from the rear end 74 of the baffle 70. That is, the upper grass-laden air streams exiting from the upper untapered portion 81 of the baffle rear end 74 flow across substantially the entire width of the blade housing rear wall 48. On the other hand, the lower grass-laden air streams exiting from the tapered portion 80 flow progressively shorter distances corresponding to the point of discharge from the tapered lower edge 78. For instance, streams exiting from the mid-point of the tapered edge 78 flow approximately halfway across the blade housing rear wall 38 while streams exiting from the lowermost end of the tapered edge 78 flow only a very short distance. For best results, the tapered rearmost portion 80 preferably extends through an arc of about 70 to 80 degrees, most preferably about 75 degrees.

The top edge 82 of the frontmost portion of the baffle 70 can be tapered upwardly and rearwardly as best shown in FIG. 5. The height of the remaining portion of the baffle 70 can be approximately the same as that of the side wall 34.

In operation, the lower portion 66 of the flap 64 drags along the mowed grass to provide an effective air seal substantially across the rear blade housing 27. The flap 64 also acts as an effective barrier to prevent the high velocity discharge of solid particles from the rear of the blade housing 27. The streams of grass-laden air impelled toward the side wall 34 are discharged from the baffle 70 in a direction generally parallel to the blade housing rear wall 38 and at progressively shorter distances from the rear end 74 of the baffle 70. The flap 64 prevents excessive amounts of grass-laden air stream from escaping directly beneath the lower edge of the blade housing rear wall 38. Thus, the grass clippings are distributed over the ground in a substantial uniform manner rather than being piled in windrows or "clumps."

Various of the features of the invention are set forth in the following claims:

We claim:

1. A rotary mower comprising a blade housing supported on wheels for travel along the ground and including a top deck, a front wall depending from said top deck, opposed side walls depending from said top deck and having respective rear portions and being adapted to substantially prevent side discharge of grass clippings, and a substantially continuous rear wall depending from said top deck and extending transversely between the rear end portions of said side walls, means extending transversely generally coextensively with said rear wall and extending downwardly to engage the mowed grass and form an air seal substantially across the rear of said blade housing, a plurality of cutter blades mounted inside said blade housing for rotary movement about laterally spaced vertical axes, an arcuate baffle disposed inside said blade housing and extending from the vicinity of said front wall to said rear wall near one of said side walls, said baffle having a forward end located adjacent said front wall and having a rear portion which extends closely adjacent the travel path of the corresponding one of said cutter blades and which terminates in a rear end located adjacent said rear wall, and drive means for rotating said cutter blades in the same direction such that a portion of the grass clippings cut by said cutter blades is impelled rearwardly toward said rear wall and another portion is impelled transversely toward said baffle and is directed by said baffle arcuately rearwardly and then in a direction generally parallel to said rear wall for distribution along said rear wall.

2. A rotary mower according to claim 1 wherein the travel paths of said cutter blades do not overlap.

3. A rotary mower according to claim 1 wherein said baffle extends through an arc of approximately 180 degrees.

4. A rotary mower according to claim 1 wherein said baffle has a lower edge and a rearmost portion of said lower edge is tapered upwardly toward said rear end of said baffle.

5. A rotary mower according to claim 4 wherein said tapered lower edge extends through an arc of about 70 to about 80 degrees.

6. A rotary mower according to claim 1 wherein said blade housing rear wall has a lower edge and wherein said air seal forming means is a flap of flexible material mounted on said rear wall and having a lower portion extending below the lower edge of said rear wall.

7. A rotary mower comprising a blade housing supported on wheels for travel along the ground and including a top deck, a front wall depending from said top deck, opposed side walls depending from said top deck and having respective rear end portions and a substantially continuous rear wall depending from said top deck, extending transversely between the rear end portions of said side walls, and having a lower edge, a flap of flexible material mounted on and extending transversely generally coextensively with said rear wall and having a lower portion extending downwardly below the lower edge of said rear wall to engage the mowed grass and form an air seal extending substantially across the rear of said blade housing, a plurality of cutter blades mounted inside said blade housing for rotary movement about laterally spaced vertical axes so that the travel paths of said cutter blades do not overlap, an arcuate baffle disposed inside said blade housing and extending near one of said side walls, said baffle having a front end located adjacent said blade housing front wall, and a rear portion which extends closely adjacent the travel path of the corresponding one of said cutter blades, which terminates in a rear end located adjacent said rear wall, and which has a lower edge including a rearmost portion which is tapered upwardly toward said rear end of said baffle, and drive means for rotating said cutter blades in the same direction such that a portion of the grass clippings cut by said cutter blades is impelled rearwardly toward said rear wall and another portion is impelled transversely toward said baffle and is directed by said baffle arcuately rearwardly and then in a direction generally parallel to said rear wall for distribution along said rear wall.

8. A rotary mower according to claim 7 wherein said baffle extends through an arc of approximately 180 degrees.

9. A rotary mower according to claim 7 wherein said tapered lower edge extends through an arc of about 70 to about 80 degrees.

* * * * *

UNITED STATES PATENT AND TRADEMARK OFFICE
CERTIFICATE OF CORRECTION

PATENT NO. : 4,502,271

DATED : March 5, 1985

INVENTOR(S) : Loren F. Hansen, et al.

It is certified that error appears in the above—identified patent and that said Letters Patent are hereby corrected as shown below:

Column 3, line 51, "glass" should be -- grass --.

Column 3, line 54, "flip" should be -- flap --.

Signed and Sealed this

Thirtieth Day of July 1985

[SEAL]

Attest:

DONALD J. QUIGG

*Attesting Officer*  *Acting Commissioner of Patents and Trademarks*